(12) United States Patent
Mason et al.

(10) Patent No.: US 7,311,245 B2
(45) Date of Patent: Dec. 25, 2007

(54) PAPER JAM DETECTION APPARATUS AND METHOD FOR AUTOMATED BANKING MACHINE

(75) Inventors: Thomas Mason, North Canton, OH (US); Barry Watzman, North Canton, OH (US); Hideo Tatiyama, Sao Paulo (BR); Milton Luciano Ifuki, Sao Paulo (BR)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 878 days.

(21) Appl. No.: 10/662,098

(22) Filed: Sep. 12, 2003

(65) Prior Publication Data

US 2004/0056086 A1 Mar. 25, 2004

Related U.S. Application Data

(60) Provisional application No. 60/410,535, filed on Sep. 12, 2002, provisional application No. 60/436,833, filed on Dec. 26, 2002.

(51) Int. Cl.
*G06F 17/60* (2006.01)

(52) U.S. Cl. ..................... 235/379; 235/380

(58) Field of Classification Search ............... 235/379, 235/380, 486
See application file for complete search history.

(56) References Cited

U.S. PATENT DOCUMENTS

| | | | |
|---|---|---|---|
| 5,106,077 A | | 4/1992 | Kawaguchi et al. |
| 5,483,047 A | | 1/1996 | Ramachandran et al. |
| 5,879,092 A | | 3/1999 | Brannan et al. |
| 6,164,638 A | * | 12/2000 | Owens et al. ............. 271/34 |
| 6,311,165 B1 | * | 10/2001 | Coutts et al. ............. 705/21 |
| 6,406,016 B1 | | 6/2002 | Ehara et al. |
| 6,547,464 B1 | | 4/2003 | Lewis et al. |
| 6,648,220 B1 | * | 11/2003 | Junkins et al. ............. 235/379 |

* cited by examiner

*Primary Examiner*—Daniel Stcyr
(74) *Attorney, Agent, or Firm*—Daniel D. Wasil; Ralph E. Jocke; Walker & Jocke

(57) ABSTRACT

A system indicates fault conditions in an automated banking machine apparatus. A journal printer (12, 106) is supplied with paper from a paper supply (16, 112). A paper take-up device (18, 114) receives paper from the printer. Movement of the take-up device is sensed by a detector (70, 146, 124). The detector is connected to an electronic circuit (74, 118) including a processor (76, 120). Fault signals are generated by the electronic circuit responsive to the detector sensing conditions representative of a paper jam and a paper break.

60 Claims, 7 Drawing Sheets

PAPER JAM DETECTION APPARATUS AND METHOD FOR AUTOMATED BANKING MACHINE

CROSS REFERENCE TO RELATED APPLICATIONS

This application claims the benefit of U.S. Provisional Application No. 60/410,535 filed Sep. 12, 2002 and 60/436,833 filed Dec. 26, 2002.

TECHNICAL FIELD

This invention relates to automated banking machines. Specifically, this invention relates to a system and method for detecting fault conditions which occur with paper associated with a journal printer mechanism in an automated teller machine.

BACKGROUND ART

Automated banking machines are well known in the prior art. Automated banking machines include transaction conducting machines which can be used to perform transactions which have financial consequences to a user and/or other persons or entities. For example, automated banking machines may include devices for purchasing goods or services, devices for dispensing items of value such as vouchers, tickets, checks, notes, or currency, as well as automated teller machines, which may dispense cash or notes and which in some cases may be used to accept deposits, transfer funds, and conduct other types of banking or financial transactions.

In many types of automated banking machines, including automated teller machines (ATMs), it is common to include a journal printer inside the machine. The function of the journal printer is to make a paper record of each transaction that has been conducted at the ATM. This enables the institution that operates the ATM to verify its electronic records and to reconstruct them in the event of a failure. An example of an ATM is shown in U.S. Pat. No. 5,483,047, the disclosure of which is fully incorporated herein by reference.

Journal printers typically involve recording transaction information on paper that is supplied from a paper roll. The paper from the roll is passed through the printer where the data is printed on the paper responsive to the corresponding transaction. After printing, the paper is rewound onto a take-up roll. As transactions are recorded, blank paper on the supply roll is used and the diameter of the supply roll decreases. As paper upon which data has been recorded is transferred to the take-up roll, the take-up roll increases in diameter. Eventually, when the amount of paper remaining on the supply roll is nearly depleted, the supply roll must be replaced and the paper on the take-up roll removed. The process is then repeated with additional transactions being recorded on the paper from a new supply roll.

The reliable operation of the journal printer is important to insure that the institution operating the ATM has a hard copy record of all the transactions that have been conducted. It is undesirable for the supply roll of the journal printer to be depleted, as this results in transactions for which there may be no hardtop record. In some existing ATMs, the need to replace the supply roll is determined electronically by storing in the memory of the machine the number of data lines printed by the journal printer since the last roll change. Such systems require for their operation that all replacement rolls be identical. This is not always the case. If the roll is either "too short" or "too long" then a paper out condition may arise or excess paper may be unnecessarily discarded.

A person servicing the ATM to replace the supply roll may forget to reset the system when the paper is replaced. This can result in the automated teller machine indicating that it is in a paper low condition when in fact no such problem exists. Also, a problem such as a paper jam may occur in the middle of a roll. In this situation the technician must start a new roll and reset the machine. This may waste a significant amount of paper.

Journal printers sometimes experience paper jams. Paper jams usually result in the paper no longer moving through the printer. During a jam, the printer mechanism prints data concerning a multitude of transactions on the same area of paper. As a result, the hard copy record of these transactions is lost. Only the most severe paper jams that trigger signals indicating a malfunction in other components are generally detected by existing automated teller machines. For example, if the paper jam condition is sufficient to prevent the printer mechanism from moving as required to produce characters on paper, then a printer fault indication may be given. However, in most circumstances, paper jams are not sufficiently severe to impact the operation of other components. Such paper jams go undetected until a visual inspection is made by a service technician.

Other types of fault conditions may arise with regard to a journal printer. A technician may remove a spent roll and forget to put in a new one even though the machine has been reset. Paper rolls may also have breaks at splices. In either situation the journal printer will become inoperative and this condition may go undetected for some time.

Problems may also result when a replacement roll has not been properly installed. The ATM may be run for an extended time before it is discovered that paper is not feeding through the journal printer.

Thus, there exists a need for a system and method for indicating fault conditions concerning paper movement associated with a journal printer in an automated banking machine.

DISCLOSURE OF INVENTION

It is an object of an exemplary form of the present invention to provide an apparatus for indicating a fault condition in a system in which a roll takes up paper or media.

It is an object of an exemplary form of the present invention to provide an apparatus for indicating a fault condition in a system in which a take-up roll is supplied with paper from a printer.

It is a further object of an exemplary form of the present invention to provide an apparatus for indicating a paper jam condition with a journal printer in an automated banking machine.

It is a further object of an exemplary form of the present invention to provide an apparatus for indicating fault conditions in a system including a journal printer in an automated banking machine in which paper supplied by a paper roll is taken up by a take-up roll.

It is a further object of an exemplary form of the present invention to provide an apparatus for indicating a paper low condition for a supply roll supplying a journal printer in an automated banking machine.

It is a further object of an exemplary form of the present invention to provide an apparatus for indicating fault conditions in a system including a journal printer in an automated banking machine which detects the movement of journal printer paper and which determines that such paper is moving in coordination with a journal printer.

It is a further object of an exemplary form of the present invention to provide an apparatus for indicating fault conditions in a system including a journal printer in an automated banking machine which detects the movement of a journal printer take-up roll and which determines that such roll is moving properly.

It is a further object of an exemplary form of the present invention to provide an apparatus for detecting proper movement of a journal printer paper which enables readily changing the supply roll and/or take-up roll.

It is a further object of an exemplary form of the present invention to provide an apparatus for detecting the proper movement of a journal printer take-up roll which apparatus is engaged with said take-up roll so as to indicate the movement thereof but which is readily disengagable from said take-up roll to enable the replacement thereof.

It is a further object of an exemplary form of the present invention to provide an apparatus for detecting severance of paper associated with a printer.

It is a further object of an exemplary form of the present invention to provide a method for indicating a fault condition in a system in which a take-up roll is supplied with paper from a journal printer in an automated banking machine.

Further objects of exemplary forms of the present invention will be made apparent in the following Best Mode for Carrying Out Invention and the appended claims.

The foregoing objects are accomplished in exemplary embodiments of the present invention by an apparatus for indicating fault conditions in a transaction recording system within an automated banking machine. The system includes a journal printer that is supplied with paper from a paper supply. The printer operates to move paper from the supply and to print transaction data thereon. The paper with the printed data is rewound onto a journal printer take-up roll.

In an exemplary embodiment, paper is supplied to the printer from a roll or other type of paper supply. The printer may include a printer drive mechanism which can engage the paper and move it through the printer in coordination with the printing on the paper. The paper with the printed data can be rewound onto a take-up roll. The take-up roll can be moved by a take-up roll drive mechanism.

Between the printer and the take-up roll the paper passes through an area which comprises a gap. The paper is movable in the gap in a direction of paper movement from the printer toward the take-up roll.

The operations of the printer drive mechanism and the take-up roll drive mechanism are coordinated by a coordinating mechanism, such as a processor. The printer drive can first move the paper toward the take-up roll and a time thereafter the take-up roll drive mechanism can move the take-up roll to take up slack in the paper. This action may cause the paper to move back and forth in the gap in a direction that is generally perpendicular to the direction of paper movement. The coordinating mechanism may also operate the take-up roll drive mechanism to take up paper while the printer drive is operating to move paper.

The paper take-up roll may be supported on a spindle. The spindle can be moved by the take-up roll drive mechanism. A wire spring may extend from the spindle to serve as a connecting member and connect the spindle to the take-up roll. As a result, the take-up roll can be rotatably engaged with the spindle so as to move therewith.

An encoder member can be supported on an end of the take-up roll spindle. The encoder member can include a plurality of uniformly spaced indicia which may include a plurality of slotted openings.

A detector or sensor, such as an optical detector device, may be positioned adjacent to the encoder member. The detector may operate to detect rotation of the encoder member which is indicative of rotation of the paper take-up roll.

A second detector may be adjacent to the paper take-up roll. The second detector may serve as a paper high detector and/or paper low detector. The second detector may sense a side face portion of the paper take-up roll. The second detector is operative to provide a signal when the diameter or size of the paper on the take-up roll has increased to a predetermined level.

An electronic circuit, which may include a processor, can be in operative connection with the printer and the first and second detectors. A processor may be programmed so that fault signals are provided when a combination of certain conditions are detected in accordance with the programming of the processor.

In a successful operation, the printer operates to print a number of lines and move the paper toward the take-up roll. The take-up roll drive mechanism operates to move the take-up roll to take up the paper. The take-up roll drive mechanism may move the take-up roll to take up any slack in the paper in the gap.

A monitoring operation can use boolean logic to determine that the paper is both "not jammed" AND "not torn", thus assuring to the lay printer operator that the paper is "not (jammed OR torn)". The monitoring operation can use the same sensor in the determining. That is, the monitoring operation can use the same sensor in determining both a paper jam and a paper break. The sensor can be adjacent to a take-up roll spindle.

A monitoring operation can include a first step of driving the journal printer and the take-up roll spindle or shaft and simultaneously monitoring the take-up spindle rotation to determine if the paper is jammed. If paper jams, such as in the journal printer, then the take-up spindle will tighten any loose circumference on the take-up roll and stall, which can be determined or detected. A determination of take-up spindle motion (i.e., the take-up spindle is able to rotate) can be used to negate the likelihood or possibility of a paper jam.

When printing is complete (e.g., non operation of the printer drive, paper movement is stopped, the printing cycle has ceased), then in a second step the take-up spindle can be driven to check for take-up spindle stall. A determination or verification of take-up spindle stall can be used to negate the likelihood or possibility of torn paper.

Thus, the monitoring includes at least a first monitoring step and a second monitoring step. The first step can determine whether paper is jammed. The second step can determine whether paper is torn or a paper break. Upon determining a paper jam, a fault detection signal representative of a "paper jam" can be implemented. Upon determining a paper break, a fault detection signal representative of a "paper break" can be implemented. The first step may be viewed as a simultaneous step and the second step may be viewed as a final step.

An additional initialization step may be included in the monitoring. The initialization step can be implemented before printing to initially check (or double check) if paper is torn. The initialization step, being similar to the final step, can test for take-up spindle stall. A determination of take-up spindle stall prior to printing can be used as an indication that the paper is not torn and is ready for printing. The checking of the take-up roll prior to a printing operation can result in the prevention of undesired printing. For example, severed paper may be the result of machine tampering. The initialization step can check for tampering in between prints (e.g., in between automated banking machine transactions). That is, before commencing a current print operation, the initialization step can be implemented to determine whether tampering related to torn paper occurred in the time between the previous print operation and the current print operation. Again, upon determining torn paper in the initialization step, a fault detection signal representative of a "paper break" (or a similar signal) can be generated.

In a first type of faulty operation, a first fault signal representative of a paper jam condition can be generated by the electronic circuit if a first detector has failed to sense movement of the printed paper, e.g., after the printer has operated to print a number of lines. That is, failure to sense the journal printer take-up roll operating properly to take up the paper. This may be due to a failure to sense rotation of the take-up roll spindle shaft. This first fault signal is indicative that the printer is attempting to print several lines of data on the paper but that the paper has not been moved or advanced by the take-up roll.

The first fault signal representative of a paper jam condition may also be generated by other conditions, such as when a replacement take-up roll has not been properly installed to permit proper rotation thereof.

In another type of faulty operation, a second fault signal representative of a paper break condition may be generated. For example, the paper or media may have been broken or torn or may have separated at a splice. The second fault signal representative of a paper break condition may be generated by the electronic circuit if the first detector has failed to sense take-up roll stoppage before and/or after the printer has operated to print. The take-up roll drive mechanism may be operated in determining if the take-up roll is (or remains) stopped. That is, failure to sense stoppage of journal printer take-up roll when it should be stopped, such as before or after a paper movement operation, may be reflective of a paper break. This may be due to a failure to sense cessation of the take-up roll spindle shaft. This second fault signal is indicative that the take-up roll is continuously attempting to take up paper because of a break in the paper.

The second fault signal may also be representative of a paper supply roll empty condition and be generated in conditions when a take-up roll has taken up all of the paper from a supply roll.

In another type of faulty operation, a third fault signal representative of a take-up roll paper high condition and/or a supply roll paper low condition may be generated. The electronic circuit can provide a take-up roll paper full signal when the second detector senses that the paper on a take-up roll has been increased to a sufficiently large size that replacement is warranted. This signal may also be indicative of low paper on the paper supply roll. That is, the paper wound onto the take-up roll can be reflective of the paper remaining on the paper supply roll. This signal may be indicative that the paper supply has been depleted (or is low) and that a hard copy record of transaction data is not being retained (or is about to lose data).

This third fault signal indicative of a paper out condition may also be given in circumstances when a replacement paper supply roll or other type of supply was not installed or was improperly installed.

BEST MODE FOR CARRYING OUT INVENTION

Figure 1:
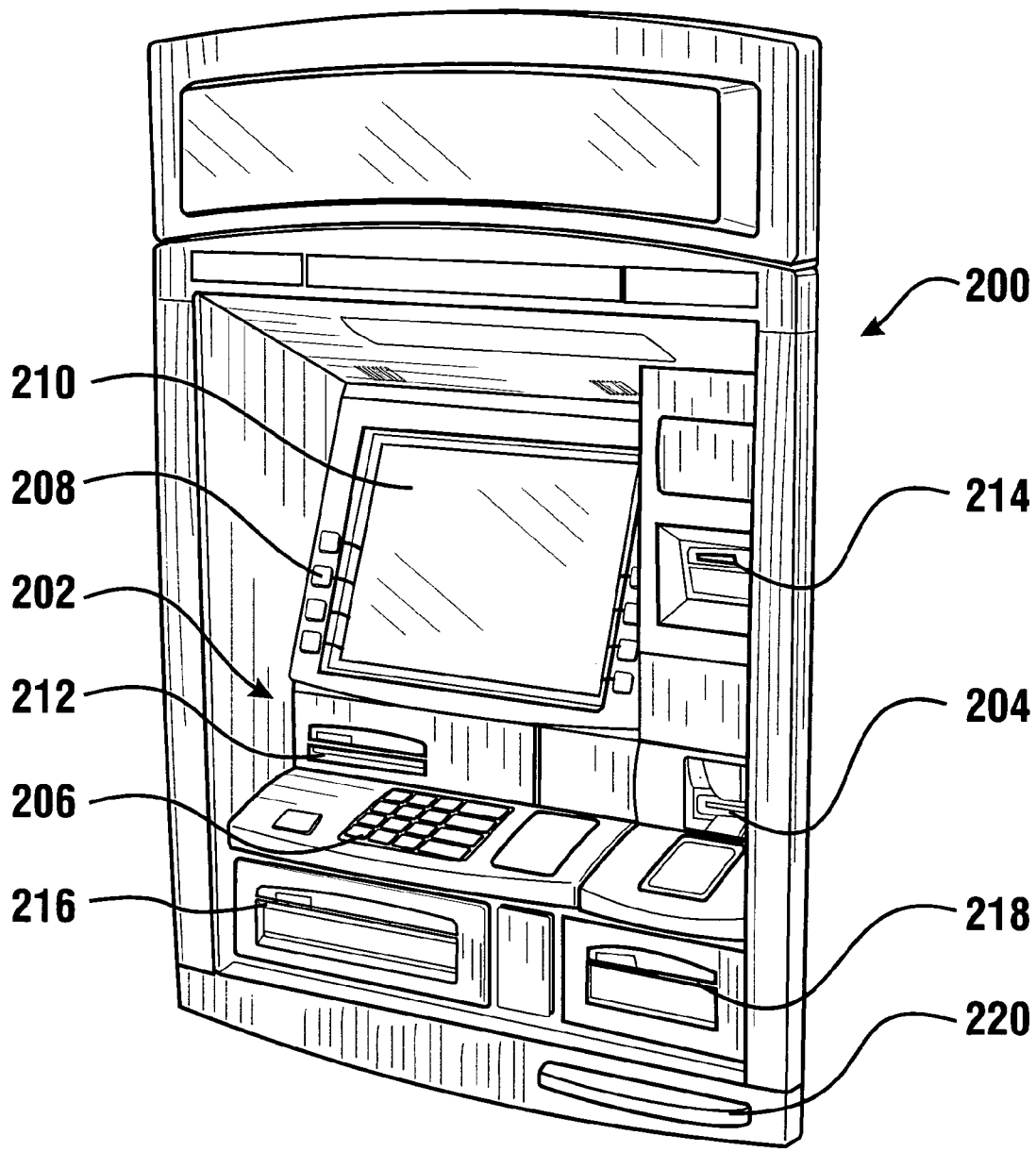
FIG. 1 is a schematic view of an automated banking machine incorporating an exemplary embodiment of the present invention.

Referring now to the drawings and particularly FIG. 1, there is shown therein an exemplary embodiment of an automated banking machine generally indicated 200. In the exemplary embodiment the machine 200 is an ATM. However it should be understood that the invention may be used in connection with other types of automated banking machines and automated transaction machines.

The ATM 200 includes a fascia 202 which serves as a user or customer interface. The fascia includes a card slot 204, keypad 206, function keys 208, display 210, receipt outlet slot 212, mini statement outlet 214, document (e.g., cash) withdrawal opening 216, document deposit opening 218, and a writing shelf 220. The ATM is operative to use the media cassettes and the divert cassettes discussed herein.

The card slot 204 is used to input a card with encoded data thereon that is usable to identify the customer and/or the customer's account information. Card slot 204 is operatively connected to a card reader input device for reading data encoded on the card. The machine may also include other input devices such as biometric readers that may be operative to receive customer identifying inputs such as fingerprints, iris scans, retina scans, face topography data, voice data, or other inputs that provide data that is usable to identify a user. An example of an ATM that uses biometric input devices and other types of input devices is shown in U.S. Pat. No. 6,023,688, the disclosure of which is fully incorporated herein by reference.

The keypad input device 206 includes a plurality of keys or buttons which may be actuated by a customer to provide inputs to the machine. The function keys 208 permit a customer to respond to screen prompts. The display 210 may be a touch screen display which enables outputs through displays on the screen and enables customers to provide inputs by placing a finger adjacent to areas of the screen. The receipt outlet slot 212 can be used to present a transaction receipt to a customer. The outlet 214 can also be used to present an account mini statement to a customer. The outlet 214 can also be used to receive other items from ticket printing mechanisms, check printing mechanisms, and other devices that operate to apply indicia to media in the course of performing transactions carried out with the machine. The opening 216 is customer accessible. The ATM includes a currency dispenser operative to dispense currency. Currency is made available to a customer at the opening 216 via the currency dispenser. As is known in the art, a currency dispenser can be used in the dispensing of currency to a customer, such as in response to a cash withdrawal transaction request.

It should be understood that these features of the described ATM user interface are exemplary and in other embodiments the user interface may include different components and/or features and/or arrangements. For example, a different arrangement may have the locations of the receipt outlet slot and the mini statement outlet switched. Likewise, the locations of the card slot and the receipt outlet slot may be switched.

The ATM 200 is also operative to include therein a journal printer. A journal printer can be operative to make a paper record of each transaction that has been conducted at the ATM.

Figure 2:
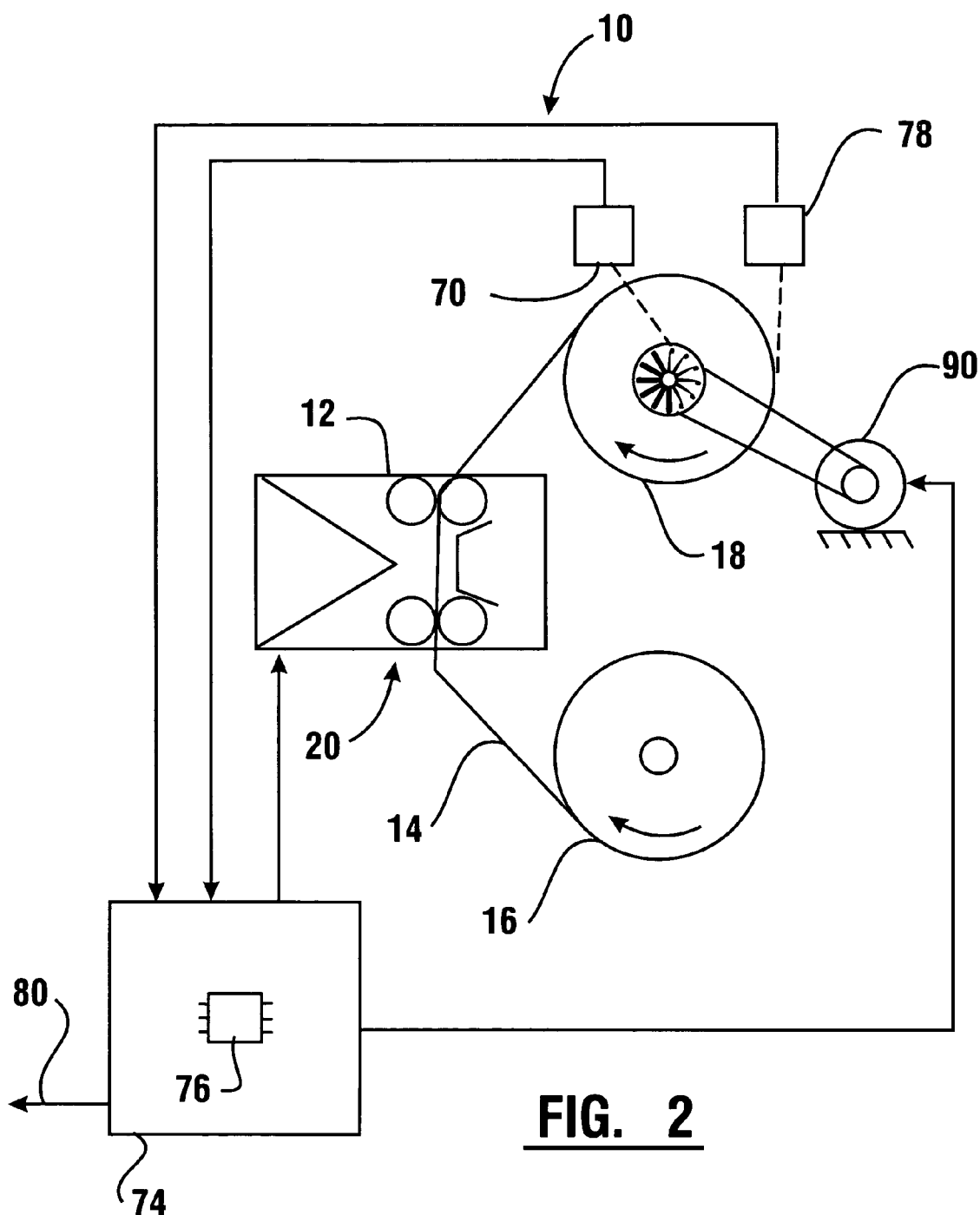
FIG. 2 is a schematic view of a fault indicating apparatus of an exemplary form of the present invention.

Referring now to the drawings and particularly to FIG. 2, there is shown therein an exemplary embodiment of a fault indicating apparatus of an exemplary form of the present invention generally indicated 10. The apparatus includes a journal printer generally indicated 12. Journal printer 12 includes mechanisms for producing printed data on paper. These can include, for example, impact printers, thermal printers, laser printers, ink jet printers or other suitable printing mechanisms.

Paper generally indicated 14, is fed from a paper supply roll 16 to printer 12. Paper that has been printed on by the journal printer 12 can be stored on a paper take-up roll 18. Thus, the paper take-up roll is operative to receive paper from a paper source device, such as a paper supply roll or a printer.

The printer 12 may include a drive schematically indicated 20 for moving the paper 14 therethrough after each line of data has been printed thereon. The take-up roll 18 may also be driven by a drive mechanism 90, such as a drive motor, so as to wind and store on the take-up roll the paper that has been printed on by journal printer 12. The take-up roll 18 can be connected to and supported on a take-up spindle 22 for rotational movement therewith. The spindle can have an encoder member 40 associated therewith. The encoder member may be rotatably engaged with the spindle to rotate therewith. The encoder member 40 may be an encoder wheel with a plurality of radially extending slotted openings positioned at a plurality of uniformly spaced radial increments thereon, as shown in more detail in FIGS. 3-5.

In an exemplary embodiment a paper testing arrangement includes a controller device, which may have a computer. The paper testing arrangement is operative to test the ability of paper in the automated banking machine (e.g., ATM) to be moved. The testing can be used to determine the operational status of being able to properly perform a print job with regard to the respective functionality of the paper, journal printer, and take-up roll. The paper testing arrangement is operative to test the ability of the paper to be moved by the take-up roll drive mechanism responsive to both the operation of the journal printer drive mechanism to move the paper and the non operation of the journal printer drive mechanism. The testing can be used to determine a paper jam and/or a paper break. Responsive to the test, the automated banking machine is operative to generate at least one fault signal responsive to at least one of the inability of the paper to be moved by the take-up roll drive despite operation of the printer drive and the ability of the paper to be moved by the take-up roll drive despite non operation of the printer drive. A paper jam determination can be made responsive to the inability of the paper to be moved by the take-up roll drive despite operation of the printer drive. A paper break determination can be made responsive to a the ability of the paper to be moved by the take-up roll drive despite non operation of the printer drive. One or more fault signals may be generated responsive to a paper jam and/or a paper break. Computer readable media (e.g., software) having computer readable instructions embodied thereon can be used to instruct the ATM during operations involving testing and fault signal generation. The computer readable instructions can be carried out by at least one computer associated with the ATM.

A fault signal may result in an output to a customer reflective that the customer request cannot be carried out. For example, an output may include displaying a message to the customer on the display screen 210 and/or returning the customer's card from the machine at the card slot 204. Also, an ATM computer is operative to submit a service signal to a service center remotely located from the ATM responsive to the generation of at least one fault signal. The service signal may comprise the generated fault signal. The service center can have a computer operative to communicate with the ATM and receive the signal.

The controller device is operable to control and coordinate the take-up roll drive mechanism and the printer drive mechanism. The operations of the printer drive mechanism and the take-up roll drive mechanism can be coordinated by a coordinator, such as by a processor, so they can operate in sequence. The drive mechanisms may be operated so that the printer drive mechanism moves the paper toward the take-up roll while the take-up roll remains stationary. This results in slack in the paper between the area where the printer drive mechanism engages the paper and the take-up roll. After the printer drive has moved the paper, the take-up roll drive mechanism can be operated to move the take-up roll to remove the slack from the paper. As discussed in more detail hereafter, the printer drive mechanism and the take-up roll drive mechanism may also be operated simultaneously.

The paper testing arrangement includes one or more electronic circuits, detectors or monitors or sensors, or encoder members, e.g., electronic circuit 74, sensor 70, and encoder member 40. The controller is operative to determine movement of the take-up roll 18 via the sensor 70 sensing movement of the encoder member 40. The detector 70 is operable to detect the passage of radiation through openings 72 in the encoder member 40 as the openings are aligned with the sensor. A sensor can be a sensor device. A sensor can comprise one or more sensors. A sensor can be used in operation with (or be a part of) firmware. Alternatively, firmware may be a part of the sensor. In the exemplary embodiment the sensor 70 can be an opto-interrupter sensor. Of course in other embodiments other types of detectors or monitors or sensors may be used. As the spindle 22 rotates, the sensor 70 sequentially senses the passage and blockage of light as openings 72 are aligned in the sensor.

The detector 70 can be electrically connected through an appropriate interface to the electronic circuit schematically indicated 74. Electronic circuit 74 can include a processor 76 which can operate in accordance with the steps of a computer program. Electronic circuit 74 may also be connected to the journal printer 12 for operation thereof and/or feedback therefrom.

The electronic circuit 74 can operate to output fault indication signals in response to a determination that there is a paper jam or a comparable condition; that there is a paper break; that the paper on the take-up roll 18 is high or full; or that the paper on the supply roll is low or out of paper or a comparable condition. These signals can be given in response to the processor 76 generally executing computer program steps. Thus, the same sensor 70 can be used in determining both a paper jam and a paper break. Furthermore, the same sensor 70 may be a single sensor.

It will be understood by those skilled in the art that because the diameter of paper take-up roll 18 varies as paper is used, the amount that the spindle will rotate in response to the printer 12 moving a predetermined amount of paper toward the take-up roll will vary. The spindle will rotate a greater amount for a given length of paper when the take-up roll is nearly empty. The take-up roll will gradually decrease the angular displacement for a given amount of paper as the take-up roll approaches a full condition.

Printer mechanisms are generally set up such that each line of printed data occupies a predetermined width on the paper. This width extends in a transverse band. Each time the printer is instructed by the printer driver control to move to the position to print the next line of data, the drive 20 of the printer operates to attempt to move the paper forward a predetermined distance. Because the printer advance for each line of data is constant, but the amount of associated rotation of the spindle and the attached encoder member 40 varies, the processor of the present invention can be programmed so as to prevent the generation of fault signals in circumstances where the encoder member has only moved slightly due to a large diameter of the take-up roll.

The processor 76 is connected to printer 12 so as to enable the printing of a line of data on the paper. The system may include a preset maximum printed line limit which is reflective of a full take-up roll. A line counter can be incremented when an additional line of paper has been printed. The line counter can be checked to determine if the total number of lines that has been printed is equal to a maximum total number. This maximum number can be preprogrammed so that for the largest roll to be generated on spindle 22 the encoder member is no longer able to move sufficiently so as to produce a change in signal at detector 70 after the preset total number of lines has been printed. That is, eventually the amount of paper taken up by the take-up roll produces a diameter such that any additional rotation movement of the spindle to take up a printed line or lines would be so small that rotation of the take-up roll cannot be properly determined using the encoder member. If the counter has reached the preset maximum printed line limit, then the processor can signal that the take-up roll is full and a shutdown of the journal printer may ensue. If the counter has not yet reached this preset maximum limit, the journal printer is operative to print the next line.

The controller or processor attempts to rotate the take-up roll to take up slack in paper. The processor can signal for the take-up roll to be driven during the printing or after a set number of lines has been printed. For example, the set number of printed lines may be one or four or it may be a function of other sensed information, such as measured amount of paper slack.

The processor checks to determine if there has been a change in signal from a detector 70. This would indicate that the spindle has rotated enough to indicate at least one change from "dark" to "light" or vice versa. This would further indicate that the take-up roll has rotated. The processor can make a decision as to whether such a change in signal from the detector 70 has occurred. If at least one change in signal has occurred, then the controller determines that the take-up roll has properly taken up paper, and the printer is set ready to print again or continue printing.

The monitoring of a paper jam can occur during simultaneous driving of the printer and take-up roll. If the controller is set to drive the take-up roll during the printing, then the controller can determine whether the encoder has not changed condition during the printing. If the controller determines that the encoder has not changed condition during simultaneous driving of the printer and take-up roll, then this is representative of a problem or fault condition. The monitoring of a paper jam may occur after a set number of lines has been printed. If the controller is set to drive the take-up roll after a set number of lines has been printed, then the controller can determine whether the encoder has not changed condition after the printing of the lines. If the controller determines that the encoder has not changed condition after a set number of lines has been printed then this is also representative of a problem or fault condition.

The encoder, and also the take-up roll, may be unable to rotate or stall because of a paper jam. The processor is then operative to cause a first signal type or first fault detection signal representative of a "paper jam" or a comparable fault condition to be implemented. Additionally, the drive mechanism 90 may be set to provide a drive to the take-up roll below a predetermined level which is operative to tear or induce breakage of the paper. That is, the apparatus may be arranged or configured so that a paper jam does not cause a paper break. If a paper jam occurs, then the take-up spindle may be able to operate to tighten any loose circumference on the paper take-up roll and then stall, which can be determined or detected.

As it is often not desirable to operate an automated banking machine, such as an ATM, without an operable journal printer, in addition to giving a paper jam signal, the processor or the paper jam signal may also operate to stop further operation of the machine after it has completed the pending transaction. Alternatively, a backup or secondary operable journal printer may be activated or assigned.

The first fault detection signal may also be generated if the take-up roll 18 has not been properly installed. This will cause the roll to bind and not wind paper. In each case the first fault detection signal indicates that printed paper from the printer is not being wound on the take-up roll 18.

A second fault detection signal may be generated in response to other conditions, such as a paper break. For example, a second signal type may be given if the paper is severed or broken or torn. This may be due to a break at a splice in the paper. A test or check for a paper break may occur at a time prior to, during, and/or after a print operation.

A check for a paper break can occur prior to printing. The take-up roll can be checked to determine whether it is stopped (i.e., cannot be rotated in the take-up direction or cannot be freely rotated) prior to printing. If the controller determines via the detector 70 that the encoder can change condition (i.e., the take-up roll is rotatable) prior to a print operation, then a second signal type may be given. That is, if the processor can determine that the encoder can be continuously moved (or can be freely moved, or can be moved a distance further than a predetermined distance, or can be moved for a period of time greater than a predetermined time), then a "paper break" signal (or a signal similar thereto) can be generated. The checking for stoppage of the take-up roll prior to a printing operation can result in the prevention of undesired printing. For example, severed paper may be the result of machine tampering. Further, as previously discussed, in addition to generating the paper break signal, which can be a second type of fault signal, the processor may cause operation of the automated banking machine (e.g., ATM) to discontinue after completing the then pending transaction.

If the controller determines via the detector 70 that the encoder can change condition (i.e., the take-up roll is rotatable) after a print operation, e.g., stoppage of the encoder has not occurred as expected, then the second signal type may be given. That is, if the processor determines that the encoder can be continuously moved (or can be moved a distance further than a predetermined amount, or can be moved for a period of time greater than a predetermined amount), then a "paper break" signal can be generated. Thus, after the printer drive has been stopped, yet the take-up roll can be continually (or again) driven, then such action is reflective of a paper break.

A monitoring operation can use boolean logic to determine that the paper is both "not jammed" AND "not torn", thus assuring to the lay printer operator that the paper is "not (jammed OR torn)". A monitoring operation can include (e.g., in a first step) driving the printer and the take-up roll spindle and simultaneously monitoring the take-up spindle rotation to determine if the paper is jammed. A paper jam (e.g., the take-up spindle is unable to rotate or stalls) can be determined or verified. A "paper jam" signal can be output. Contrarily, if the take-up roll is able to rotate to take up paper, then a determination can be made that a paper jam is absent.

When printing is complete then the monitoring operation (e.g., in a second step) can drive the take-up spindle to check whether it is unable to rotate or becomes stalled. If the take-up spindle cannot freely move, then a determination can be made that a paper break is absent. Contrarily, if the take-up roll is freely movable then a determination is made of a paper break. A "paper break" signal can be output. Thus, an improper or unretrievable journal printing can be avoided and corrective action can be taken (e.g., the next print job can be diverted to an operable backup printing arrangement).

Thus, a printing arrangement monitoring operation of an exemplary embodiment of the present invention can include at least a first monitoring step and a second monitoring step. The first step can make a determination regarding a paper jam. The second step can make a determination regarding a paper break.

Furthermore, an initialization step may also be included in the printing arrangement monitoring operation. The initialization step can be carried out upon receiving a print job request but prior to the journal printer printing operation (implementing the requested print job) to initially check (or double check) for a paper break. An initialization step following a second step can be viewed as a double check for a paper break. The initialization step can be carried out similar to the second step to test the take-up spindle's ability to move. If the take-up spindle cannot freely move (i.e., indicative that there is no paper break) then a determination is made that the printing arrangement is ready for printing the requested print job. Alternatively, the initialization step can be carried out on a timed basis during down time (in between print jobs) to reduce customer waiting. That is, the printing arrangement (paper roll, journal printer, take-up roll) can be tested on a predetermined basis prior to a print job being requested. Thus, the status of a printing arrangement could be detected and corrected (e.g., diverting printing operations to another journal printer, etc.) on a continuous basis to prevent printing delays.

A determination that the encoder is continuously moving or has not stopped may also involve the detector 70. Hence, the same detector device can be used to ascertain both a "paper jam" condition and a "paper break" condition. The processor can use the detector 70 to determine whether the take-up roll properly stopped as expected. For example, the processor, after a set time period after the first reading of the detector 70, may take another (e.g., second) reading from the detector 70. The processor can compare the first and second readings (or additional readings). A difference in comparison can be an indication that the take-up roll did not properly stop.

Alternatively, other arrangements and devices may be used to determine whether the take-up roll has stopped. For example, the processor can be in operative connection with another motion detector placed adjacent to the spindle. Alternatively sensors may detect the electrical load or other electrical properties of the motor driving the take-up roll to determine if it is running or stopped.

The "paper break" signal may also be given in other comparable situations. These would include situations in which a technician has taken out a full take-up roll and forgotten to put in a new take-up roll, or when a new take-up roll has been installed improperly, such as when the new take-up roll has not been properly affixed to the printer paper. In these situations, the recorded transaction information is not being saved due to absence of the printed paper being stored by the take-up roll.

In another type of faulty operation, a third fault detection signal may be generated. The third fault detection signal or third signal type may be representative of a take-up roll paper high condition. Also, a take-up roll and a supply roll may correspond to each other in such a manner that a "take-up roll paper high" condition can be reflective or analogous of a "supply roll paper low" condition.

The apparatus of exemplary embodiments may include a second detector 78 in the determination of a third faulty operation. The second detector 78 may be an opto-electric detector. Of course in other embodiments other types of detectors may be used instead of electro-optical detectors. Second detector 78 can be placed in a number of detecting positions. For example, the second detector can be placed so that the spindle is intermediate the journal printer and the second detector. The second detector 78 can be electrically connected through an appropriate interface to the electronic circuit 74. The second detector 78 may operate to direct a radiation beam against a side face portion of the take-up roll 18 and to detect the light reflected therefrom.

The diameter of take-up roll can increase so that the side face surface is present in the area adjacent the second detector. As a result, the second detector can receive reflected light from the side face portion. Thus, the detector can sense that the paper has reached a predetermined diameter on the take-up roll. This condition may be sensed as a paper full condition for the take-up roll 18.

Alternatively, other second detector arrangements may be used. For example, a second detector may constantly detect reflected radiation from a paper face surface. A change in reflectance level occurs when the paper diameter nears the detector. A detected predetermined reflectance level can be used to indicate a paper full condition.

Also, a second detector may be positioned to direct a light beam against a paper face surface on the take-up roll. In such an embodiment the second detector can include a receiver disposed from a transmitter. The receiver can be positioned at an angle relative to the transmitter to receive reflected light from the paper face. The angle can be predetermined based on the expected full diameter of the roll. Thus, once the wound paper reaches a predetermined diameter a light beam is able to be reflected therefrom and then be received by the receiver.

In a further example, a second detector may include a transmitter and a receiver disposed from each other such that an unreflected light beam is able to be received while the take-up roll is not full. That is, once the paper has reached a predetermined diameter on the take-up roll then the light beam is blocked and the receiver is no longer able to receive light from the transmitter. Thus, based on the detector not receiving light, a determination can be made that the take-up roll is at a full condition.

Furthermore, the amount of paper remaining on a paper supply roll may be related to the paper taken up by a paper take-up roll. For example, when a second detector can sense that taken up paper has reached a predetermined diameter on the take-up roll, then this condition may be determined as a "supply paper low" condition for the paper supply roll, or broadly a "roller servicing required" condition. That is, the paper wound onto the take-up roll can be an indicator of the paper remaining on the paper supply roll. For example, a second detector 78 may be positioned adjacent to the take-up roll to accurately reflect when the paper supply is nearly empty. Conversely, a second detector 78 may be positioned adjacent to the paper supply to reflect when the take-up roll is nearly full. In either situation the computer may cause an appropriate third fault signal or message to be generated requesting appropriate machine servicing. The electronic circuit 74 may operate as schematically indicated in FIG. 2 to output electrical signals on a line schematically indicated 80.

The electronic circuit can generate a take-up roll paper full signal when the second detector senses that the paper on a take-up roll has been increased to a sufficiently large size that replacement is warranted. As previously discussed, this signal may alternatively or additionally be indicative of low paper on the paper supply roll. This signal may be indicative that the paper supply has been depleted (or is low) and that a hard copy record of transaction data is not being retained (or is about to lose data).

This third fault signal indicative of a roll needing a changed condition may also be given in circumstances when a replacement paper supply roll or other type of supply was not installed or was improperly installed.

Figure 3:
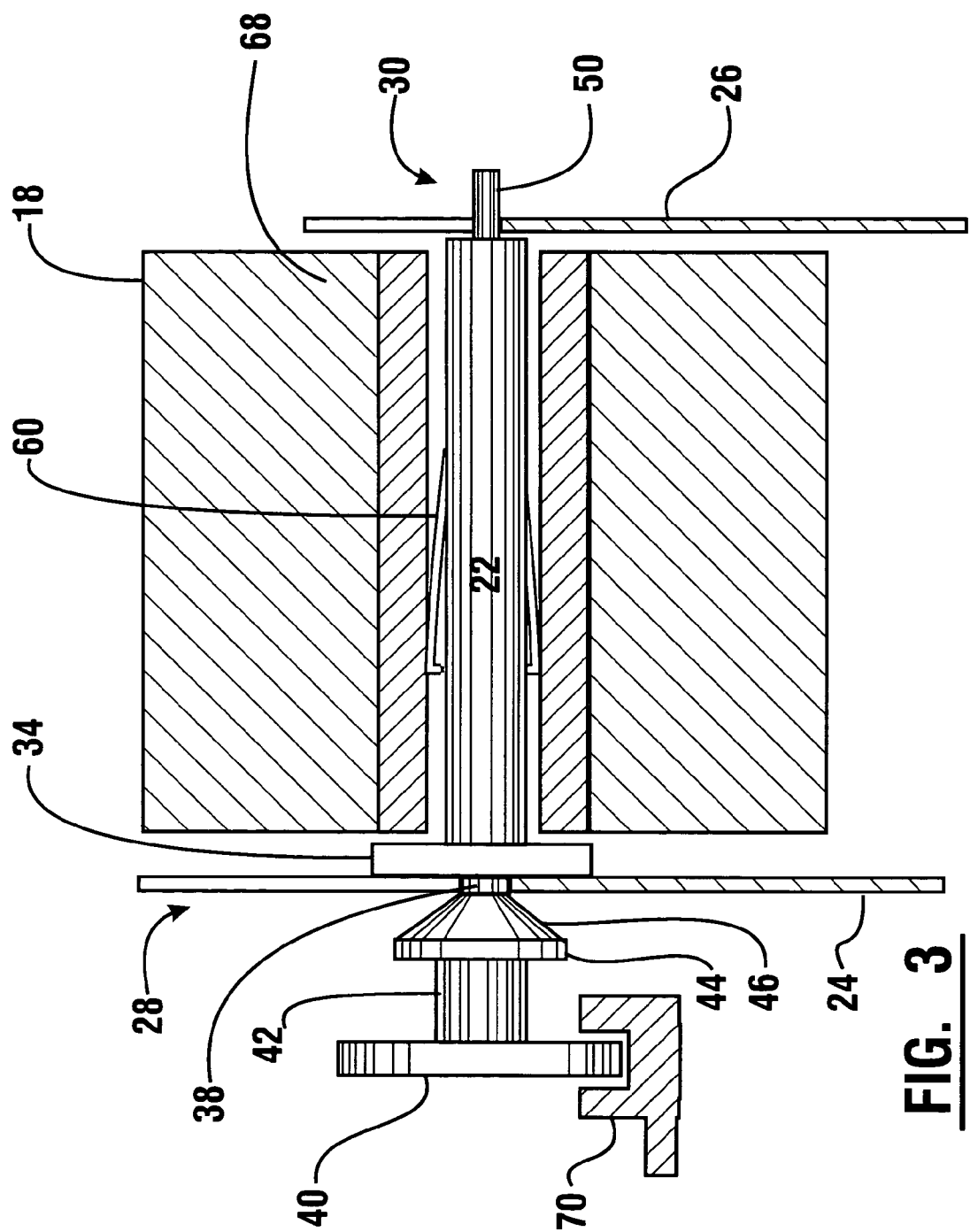
FIG. 3 is a sectional side view of a paper take-up roll, spindle, and spindle rotation detector.

In an exemplary embodiment the paper take-up roll 18 can be supported on a spindle. An exemplary spindle 22 is shown in more detail in FIGS. 3-5. Spindle 22 can be supported on a first side by a first vertically extending wall 24. Spindle 22 can be supported at an opposed side by a second vertically extending wall 26. First wall 24 can include a first slot 28 therein. First slot 28 includes an open end and a closed end. The spindle is supported at the closed end of the first slot 28 when in the operative position as shown in FIG. 3. The spindle 22 may be removed from the first slot 28 through the open end to enable replacement of the take-up roll 18.

Second wall 26 can include a second slot 30. The second slot 30 has open and closed ends. The spindle 22 can be supported at the closed end of the second slot when in the operative position as shown in FIG. 3. Similarly, the spindle may be removed through the open end of the second slot when the take-up roll is to be replaced, such as when the take-up roll is full.

Figure 4:
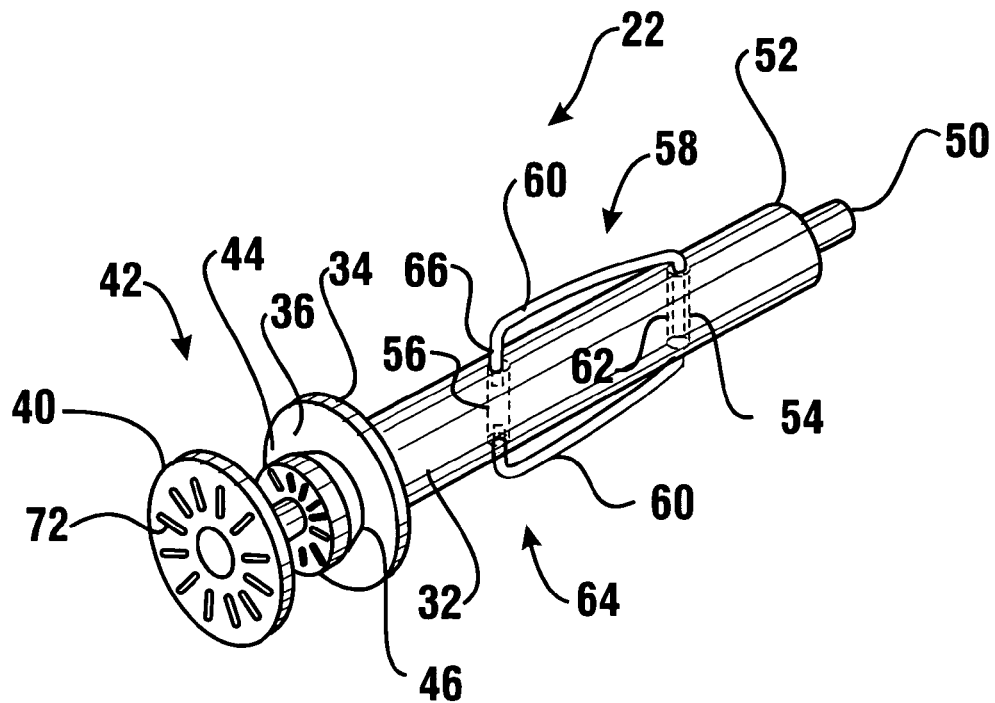
FIG. 4 is an isometric view of a spindle shown with spring arms extended.

As shown in FIGS. 3 and 4, the spindle 22 can include a spindle shaft portion 32. A flange portion 34 can be located at a first end of spindle shaft portion 32. The flange portion 34 may include a generally flat circular face 36, the purpose of which is later discussed.

An encoder support shaft portion 38 extends axially outward from flange portion 34. Encoder support shaft portion 38 can support the encoder member 40.

A retainer member 42 is movably positioned between a retaining flange 44 and the encoder member 40. Retainer member 42 is operative for engagement with a drive mechanism via a connecting device, such as a belt. The retainer member may include known features permitting engagement with a drive belt. Additionally, the retainer member may include recesses, grooves, or projections to enhance engagement with the connecting device.

The spindle 22 can be installed in supported connection with the walls 24, 26. The retaining flange 44 can include a generally frustoconical portion 46. The portion 46 may act as a guide to permit ease of installment of the spindle on the first wall 24. Installation into supported connection with the walls is accomplished by engaging a guide shaft portion 50 in the second slot 30 and engaging the encoder support shaft portion 38 in the first slot 28.

The guide shaft portion 50 is positioned at an opposite end of the spindle shaft 32 from the flange 34. Guide shaft portion 50 can be of a different diameter than spindle shaft portion 32. A radially extending step 52 can extend between guide shaft portion 50 and spindle shaft portion 32. The guide shaft portion 50 may be connectable to an alternative or second drive mechanism. Furthermore, the guide shaft portion 50 may have a take-up roll movement sensor device associated therewith.

A take-up roll 18 can be connected to a spindle 22 for rotational movement therewith. The spindle shaft portion 32 may include a diametrically extending opening 54 therethrough. A second opening 56 in spindle shaft portion 32 can be axially disposed from the opening 54 in the direction of flange portion 34. A generally u-shaped wire spring 58 can extend between the openings 54, 56. The spring 58 can include a pair of outwardly biased spring arms 60 which extend from a spring base 62. Spring base 62 can extend through the opening 54 in the shaft portion 32 as shown in FIG. 4. Spring arms 60 can each include free ends generally indicated 64 which each have radially in-turned portions 66. In-turned portions 66 can extend into the opening 56.

Figure 5:
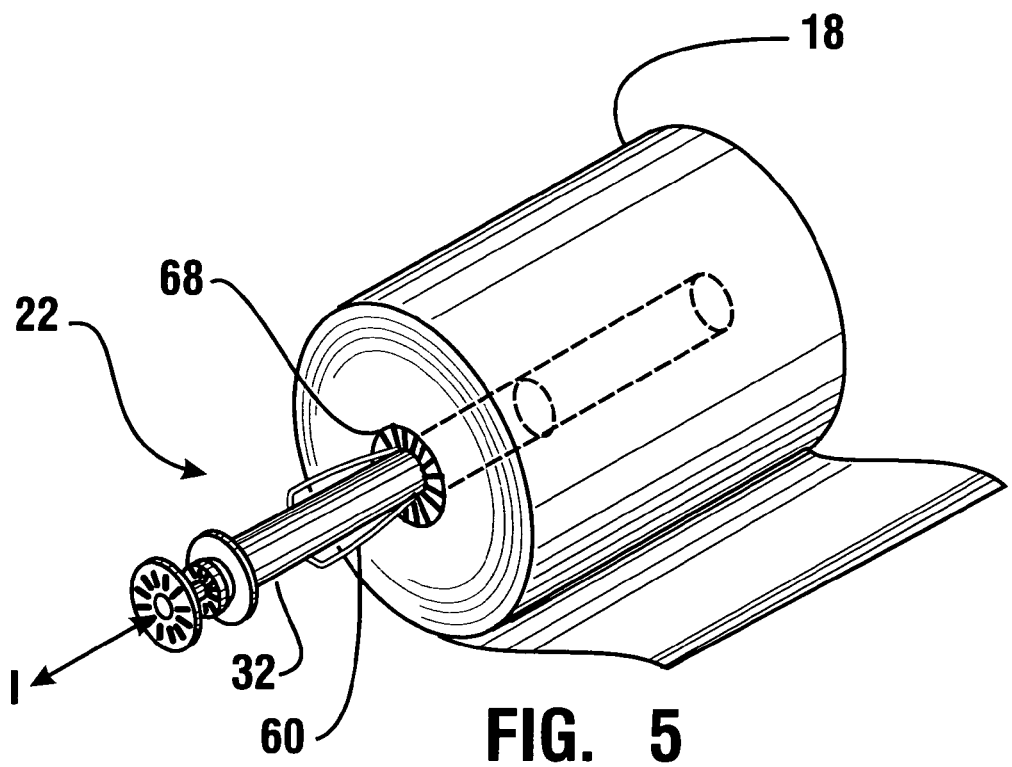
FIG. 5 is an isometric view showing the spindle partially withdrawn from a paper take-up roll.

As shown in FIG. 5, when paper take-up roll 18 is installed on the spindle 22, the spindle shaft portion 32 can be inserted into a core 68 at the center of the take-up roll 18. As the spindle shaft is inserted into the core, the engagement of the core with the spring arms moves the spring arms against the biasing force of the wire spring so that the in-turned portions 66 are moved further into opening 56 in the spindle shaft portion. The outward biasing force of the spring arms maintains engagement between the spindle 22 and the core 68 of the take-up roll 18. As a result, the spring arms 60 serve as connecting members for operatively connecting the spindle to the take-up roll so that the take-up roll is rotatably engaged therewith. FIG. 3 shows the inside diameter of the paper take-up roll core exaggerated to show the action of a pair of spring arms 60 connecting the roll and the spindle. This enables the encoder member 40 to move in response to movement of the take-up roll. Thus, sensing of the encoder member enables the detection of fault conditions such as paper jams.

The spindle 22 can be installed in or removed from the take-up roll 18 by movement of the spindle in a direction parallel to arrow I as shown in FIG. 5. FIG. 5 shows the take-up roll 18 in a substantially paper full condition.

The spindle and walls may have a relationship so that frictional forces are applied by face 36 of flange portion 34 on the inside surface of the wall 24 and frictional forces are applied by the retaining flange 44 on the outer surface of the wall 24. The combined applied frictional forces can act to resist rotation of the spindle 22. Because spindle 22 is connected to take-up roll 18 through the spring arms 60, these structures can act as a drag mechanism to prevent the spindle 22 from freely rolling. As a result, when take-up roll 18 is moved in response to printing operations being conducted by the journal printer 12, the take-up roll 18 is prevented by the drag mechanism from overrunning or overpulling due to rolling momentum. Additionally, the drag mechanism can prevent unwinding.

The force applied by the drag mechanism on the spindle insures that the encoder member accurately reflects the movement of paper from the journal printer. The force may be set such that even in the event of a minor paper jam a fault indication signal can be given. For example, the apparatus arrangement may provide for a "paper jam" signal to be given prior to any breakage of paper. In addition, the present invention enables giving accurate signals representative of a take-up paper high condition and a supply paper out condition. Furthermore, it may not be necessary to replace the take-up roll and reset a paper counter after a paper or printer problem is corrected.

The paper testing arrangement can be used to test for a paper jam and/or a paper break at various times. Testing may occur at a time prior to, during, and/or after a print job. For example, the automated banking machine (e.g., ATM) is operative to cause the paper testing arrangement to test the ability of paper to be moved during non use of the machine by a customer, such as intermediate consecutive customer transaction requests. Testing may also be programmed to occur after a set time period.

Furthermore, testing may occur at any time prior to, during, and/or after performing a transaction. Testing for a paper jam and/or a paper break may occur responsive to a customer transaction request input, such as a request requiring use of the journal printer. For example, the ATM can carry out testing responsive to a cash withdrawal request. The testing may occur responsive to receiving the cash withdrawal request. Alternatively, the testing may occur subsequent to receiving the cash withdrawal request but prior to needed operation of the cash dispenser and/or journal printer. That is, the ATM can carry out at least a portion of the request (e.g., verify PIN, etc.) prior to or simultaneously with the testing. Responsive to the testing not resulting in a fault signal, the ATM can finish (or begin) carrying out the transaction request.

Following generation of a fault signal, the ATM may be set as inactive to perform paper testing until the fault is rectified. However, the ATM can still be operative to perform customer requests not requiring operation of the journal printer. A computer associated with the ATM can make a determination whether or not a customer request can be carried out. In response to the determination the ATM can either cause the request to be performed or cause an output to be provided to the customer (i.e., provide a display message to the customer reflective that the request cannot be processed).

The testing procedure can also be initiated by a machine servicer (e.g., service personnel) to ensure machine operability. For example, a service person may conduct a test after servicing of a paper supply roll 16, a journal printer 12, and/or a take-up roll 18. The initiation of the test may include an input to the ATM by the service person.

During testing, paper 14 may be moved a distance in a direction away from the journal printer 12 and toward the take-up roll 18. The ATM (e.g., ATM controller device) is operative to cause the paper to be moved (i.e., returned) in an opposed direction at least a portion of the distance. The controller can cause return of the paper via coordinated (reverse) operation of the take-up roll drive and printer drive, and if necessary a paper roll drive. In an exemplary embodiment the paper is returned a distance generally equal to the distance the paper was initially moved during testing. The distance can be determined via use of one or more sensors and/or decoders, such as in relationship with the take-up roll. This return of paper procedure can efficiently save paper resulting in longer paper supply life. That is, the returned paper can be used for printing thereon by the journal printer.

The paper supply roll 16, journal printer 12, and take-up roll 18 are in a paper moving path. In the path the paper supply roll is upstream of the journal printer, and the journal printer is upstream of the take-up roll. In an exemplary embodiment, as previously discussed, the testing is applied in relation to the paper intermediate the journal printer and the take-up roll. However, it should be understood that the testing can also be applied in relation to the paper intermediate the paper supply roll and the journal printer. The paper testing arrangement can include previously discussed sensors and/or encoders and other devices. Thus, testing can be applied in the path ahead (front side, downstream) of the printer and behind (backside, upstream of) the printer. For example, during upstream testing the supply roll can act similar to the take-up roll during previously discussed downstream testing. The printer and supply roll can be operated to move paper opposite (i.e., reverse) to the print direction. The inability of the paper to be moved (in reverse) by the supply roll despite (reverse) operation of the printer driver is an indication of a paper jam. The ability of the paper to be moved (in reverse) by the supply roll despite non operation of the printer driver is an indication of a paper break. In an exemplary embodiment, upstream testing (involving the printer and supply roll) can be performed during the returning of the paper following the previously discussed downstream testing (involving the printer and take-up roll).

Still, further testing arrangements may be used. For example, continuing with upstream testing, the printer and supply roll can be operated to move paper in a (normal) print direction. The inability of the paper to be moved by the printer driver despite operation of the supply roll drive is an indication of a paper jam. The ability of the paper to be moved by the printer driver despite non operation of the supply roll driver is an indication of a paper break.

For further example, using downstream testing, the printer and take-up roll can be operated to move paper opposite (i.e., reverse) to the print direction. The inability of the paper to be moved by the printer driver despite operation of the take-up roll drive is an indication of a paper jam. The ability of the paper to be moved by the printer driver despite non operation of the take-up roll driver is an indication of a paper break.

Additionally, while the apparatus of the present invention is highly reliable, it does not interfere with the replacement of paper rolls or complicate the threading of the paper from the journal printer.

It will be understood by those skilled in the art that while an opto-interrupter type sensor has been indicated as a detector for detecting rotation of the take-up roll in an exemplary embodiment of the invention, other rotation sensors may be successfully used in other embodiments. For example, these may include those detectors that sense other types of indicia or features on a member that is in connection with the spindle.

While the spring arms of the wire spring serve as the connecting members in the exemplary embodiment, other types of connecting members may be used to connect the paper roll and the spindle shaft. These include other types of spring members as well as ridges or other contours which serve to provide a rigid rotational connection between the spindle and the roll. The take-up roll and spindle may also have a male/female type of engaging relationship.

While a reflective type detector is used for the second detector in the exemplary embodiment, other types of detectors may be used. For example, non-reflective type detectors may be used to sense paper between a spindle and a journal printer. Alternative detector devices or arrangements for detecting rotation of the take-up roll may also be used. Arrangements may include combinations of different detector types and/or positions to verify or enhance indication of take-up roll movement.

As previously discussed, lack of rotation of a take-up roll can be associated with a paper jam. Contrarily, continuous rotation of a take-up roll can be associated with a paper break.

The indicated rotation of a take-up roll may be sensed in a number of different manners. Movement of the actual take-up roll need not be directly sensed. A paper jam or paper break can be determined by sensing movement of other components involved in the rotational drive of a take-up roll. That is, movement of a drive component can be correspondingly linked to take-up roll movement. Movement (or lack of movement) of a drive component can be used as an indication of take-up roll movement.

As previously discussed, a spindle may be connected to, support, and drive a take-up roll. Hence, a take-up roll spindle may be detected for lack of movement thereof, such as by using an encoder, as a reliable indicator of the take-up roll being stopped. Additionally, movement of a spindle drive component may likewise be sensed to determine any corresponding rotational movement of a take-up roll.

Figure 6:
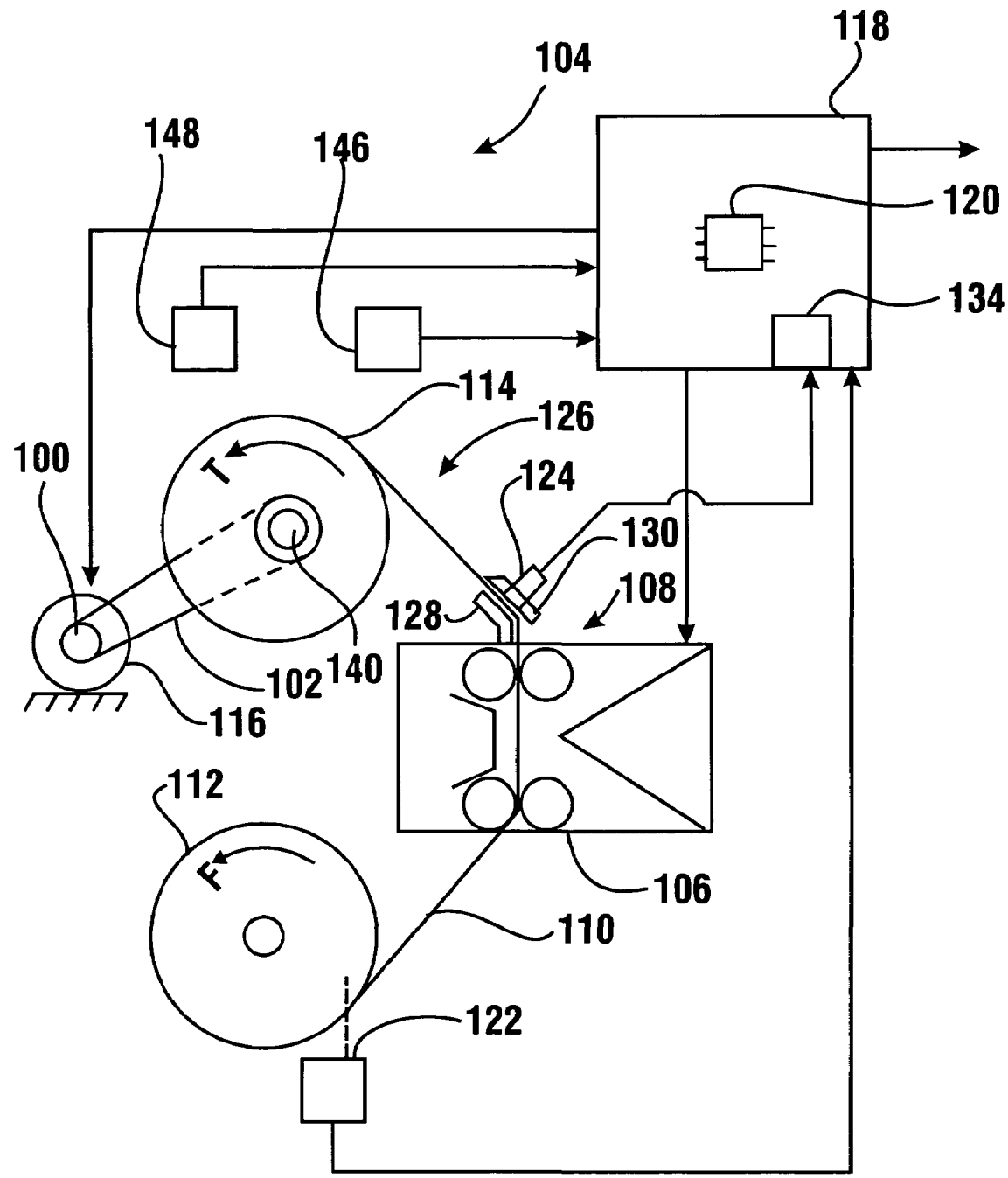
FIG. 6 is a schematic view of a fault indicating system including a cyclical paper movement detector.

FIG. 6 shows a shaft 100 driven by a take-up roll drive mechanism 116, such as an electric motor. The shaft 100, such as a motor drive shaft, can be driven by a motor to drive a take-up roll spindle 140. The spindle 140 can in turn drive a take-up roll 114. A engaging device 102, such as a drive belt, chain, pulley, multi-spindle, or gear, can be used to operatively connect or link the shaft 100 and the spindle 140. As previously discussed, an encoder member can be operatively associated with a take-up roll spindle in determining take-up roll movement. Likewise, an encoder member or some other detection device can be associated with a drive component of the take-up roll, such as the drive shaft 100. An encoder member may be arranged with drive shaft 100 in a manner similar to the arrangement of the encoder member 40 with spindle 22. A detector similar to detector 70 can be used in association with a drive shaft encoder member.

Figure 9:
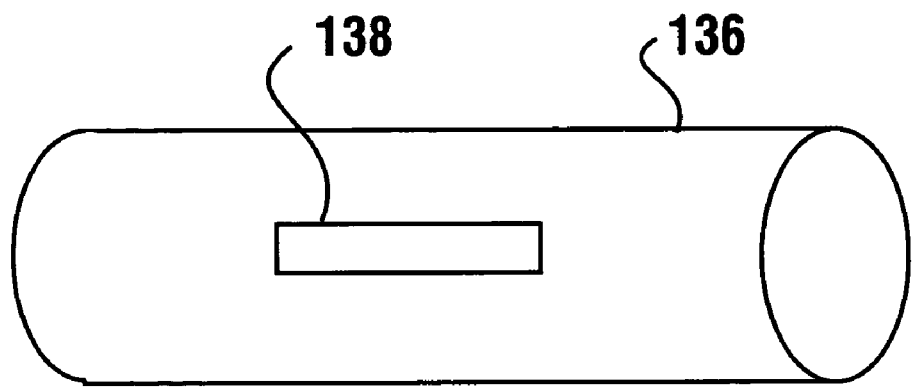
FIG. 9 shows a shaft having a torque detector associated therewith

Another manner in which movement of a take-up roll may be determined is through sensing torque, stress, or strain in a drive component. For example, the torque in a take-up roll spindle shaft or a motor drive shaft may be sensed as an indicator of take-up roll movement or stoppage. Shaft torque can increase during a paper jam (e.g., take-up roll stoppage). Shaft torque can decrease or remain constant during a page break (e.g., take-up roll free movement). Thus, a sensor can be used to detect a predetermined shaft torque level being breached. Such torque level detection can be indicative of a paper jam or a page break. FIG. 9 shows a shaft 136 having a torque detector or gauge 138 associated therewith. The torque detector can be operatively connected through an appropriate interface to the processor 76.

Figure 10:
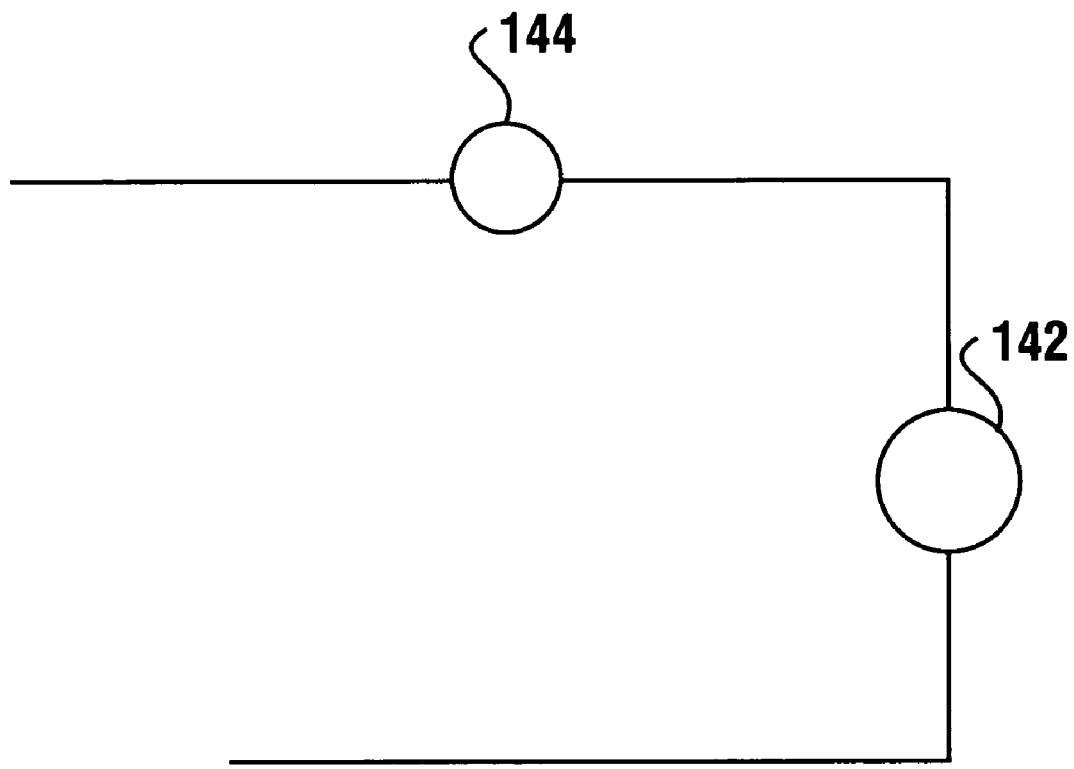
FIG. 10 shows a portion of an electric circuit having an electric motor and a current sensor associated therewith.

Alternatively, electrical current or other measurable electrical output in an electric device, such as an electric motor, may be sensed as an indicator of lack of take-up roll movement. That is, an electric motor may not be able to rotate a take-up roll when there is a paper jam. As a result of the paper jam the motor current can increase. Hence, the sensing of motor current reaching a higher predetermined level can also be used as indicator of a take-up roll not being able to move due to a paper jam. FIG. 10 shows a portion of an electric circuit having an electric motor 142 and a current sensor 144, such as an amperage sensor, associated therewith. The sensor can be electrically connected through an appropriate interface to the electronic circuit 74.

Furthermore, the tension or the slippage in a belt 102, which operatively connects a drive shaft and a take-up roll spindle, may be sensed as a type of indicator of take-up roll movement. For example, a sensing of belt tension reaching a higher predetermined or set level in a pulling portion of the belt may be used to trigger or signal an indication of a paper jam. Conversely, measurement of belt slippage could likewise be reflective of a lack of take-up roll rotation due to a paper jam.

Additionally, paper slack in the gap may be sensed as an indicator of a paper jam or a paper break. As previously discussed, the printer drive can first move the paper toward the take-up roll and thereafter the take-up roll drive mechanism can move the take-up roll to take up slack in the paper. This action can cause the paper to move back and forth in the gap intermediate the printer and the take-up roll in a direction that is generally perpendicular to the direction of paper movement toward the take-up roll. Hence, a sensor device can be used to sense cyclic movement of the paper in the perpendicular direction in the gap. Failure to sense cyclic movement of the paper in the gap can be used as an indicator of a paper jam or a paper break.

An alternative embodiment of a fault indicating apparatus generally indicated 104 is shown in FIG. 6. The previously discussed manner of testing for a paper jam and/or paper break is likewise applicable to the embodiment of FIG. 6. This second embodiment is similar to the first embodiment and includes a journal printer 106. Printer 106 includes a printer drive mechanism schematically indicated 108. The printer drive mechanism 108 moves paper 110 through the printer in coordination with the printing of lines of characters thereon.

As in the first described embodiment the printer drive mechanism 108 causes paper to be pulled from a paper supply roll 112. Roll 112 rotates in the direction indicated by Arrow F responsive to movement of the paper by the printer drive mechanism. In this second embodiment the paper supply roll may be rotatably supported on a spindle or in another suitable manner. Alternatively, in this second embodiment another form of paper supply such as a stack of fanfold paper may be used instead of a supply roll.

Paper 110 that is moved by the printer drive mechanism is stored on a take-up roll 114. The take-up roll is moved in the direction indicated by the Arrow T by a take-up roll drive mechanism 116.

As in the first described embodiment, the second described embodiment includes a paper testing arrangement having an electronic circuit 118 similar to electronic circuit 74 except as otherwise described. Electronic circuit 118 includes a processor 120. The second embodiment may also include a first detector 146 similar to detector 70. The second embodiment may also include a second detector 148 similar to detector 78. The detectors 146, 148 are shown positioned adjacent the take-up roll 114 and are in communication with the electronic circuit 118. A third detector 122 similar to detector 78 is shown positioned adjacent the paper supply roll 112.

Unlike the first embodiment, a cyclical movement detector 124 is positioned between an area where said printer drive mechanism 108 engages the paper and where the paper engages the take-up roll. The detector 124 is mounted adjacent to a gap 126. The paper 110 extends in the gap and is freely movable therein between the printer drive mechanism and the take-up roll. Gap 126 may be sized so that the paper is movable in the gap in a direction that is generally perpendicular to a plane of the paper and the direction of movement of the paper through the gap toward the take-up roll. The detector 124 is able to sense cyclical movement of the paper 110 in the gap 126.

Gap 126 is bounded at a first side by a first guide 128. Guide 128 includes a paper engaging surface that can be angled in a direction generally toward the take-up roll 114 as shown. The relative orientation of take-up roll 114 and guide 128 is such that the paper will generally be positioned adjacent to guide 128 when the paper is relatively taut between the printer drive mechanism and the take-up roll. This may be applicable for all diameters of the take-up roll. However, in other embodiments other paper guiding mechanisms may be positioned between guide 128 and the take-up roll to maintain the paper generally adjacent thereto when the paper is taut.

Gap 126 is bounded at a side opposed from guide 128 by a guide 130. Guide 130 has a paper engaging surface that can be angled similar to guide 128. Guide 130 may include a tear bar having a serrated edge 132 at its upper surface (see FIG. 7). Edge 132 can facilitate cutting of the paper when desirable, such as when manually preparing a free end of the paper to engage the take-up roll 114. The detector 124 may extend in an opening in guide 130. The detector 124 may be of the electro-optical detector type previously discussed. In other examples other types of suitable detectors may be used.

The apparatus of the second embodiment can operate in a manner similar to the first embodiment except as otherwise explained. The printer 106 operates under the control of circuit 118 and processor 120 to print lines of characters on the paper 110. The printer drive mechanism 108 moves the paper, generally one line width at a time, as printing is conducted.

The take-up roll drive mechanism 116 is also operated responsive to the control of the electronic circuit 118 and the processor. In the second embodiment, the operations of the printer drive mechanism 108 and the take-up roll drive mechanism 116 can be coordinated by a coordinator, such as by processor 120 or another computer, so they operate in sequence. Specifically, the drive mechanisms can be operated so that the printer drive mechanism moves the paper toward the gap 126 and the take-up roll 114, while the take-up roll remains stationary. This results in slack in the paper in the gap 126. After the printer drive has moved the paper, the take-up roll drive mechanism 116 moves the take-up roll 114 to remove the slack from the paper.

Figure 7:
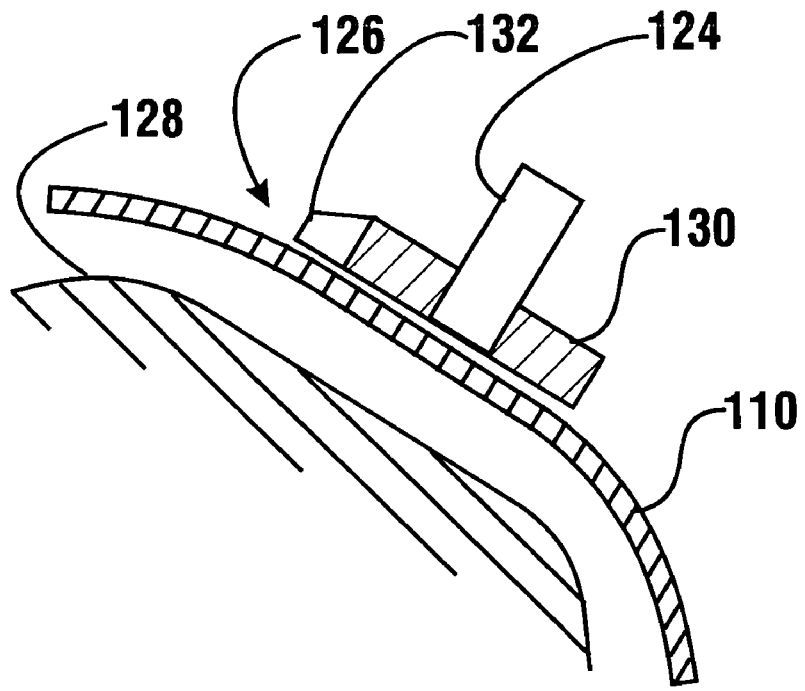
FIG. 7 is an enlarged cross sectional view of a monitoring arrangement with paper in a first position adjacent a detector.
Figure 8:
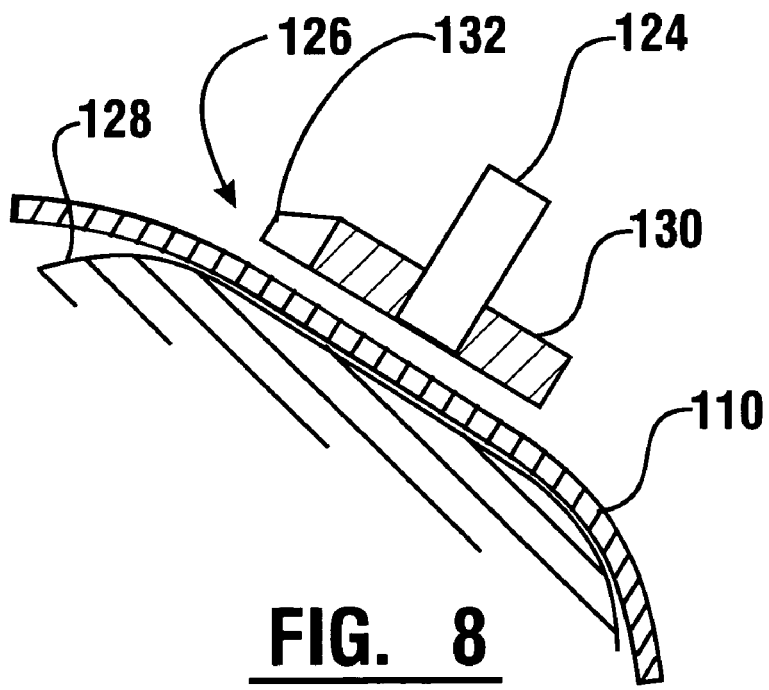
FIG. 8 is an enlarged cross sectional view similar to FIG. 7 but with the paper in a second position disposed from the detector.

The coordinated movement of the printer drive mechanism 108 and the take-up roll drive mechanism 116 causes the paper 110 to move in the gap 126 between the positions shown in FIGS. 7 and 8. When the printer drive mechanism 108 has moved the paper 110, and the take-up roll drive mechanism 116 has not yet moved, then the paper can extend in the gap generally as shown in FIG. 7. The slack in the paper and the orientation of guides 128 and 130 causes the paper to move adjacent to guide 130 and detector 124.

When the take-up roll drive mechanism 116 moves the paper a time increment after the printer drive mechanism, the paper moves in the perpendicular direction in gap 126. As the take-up roll drive mechanism takes the slack out of the paper, the paper moves toward guide 128 as shown in FIG. 8. The paper remains in this position until the printer drive mechanism 108 again moves the paper to the position shown in FIG. 7. The cyclic movement of printed paper toward and away from the detector 124 can be repeated for every print and take-up operation.

The cyclical sequential back and forth movement of the paper in the gap can be sensed by detector 124. The detector 124 may use the amount of light that is reflected from the paper in the area adjacent the detector. The detector 124 is operative to output signals in a manner similar to detector 70 of the first embodiment responsive to paper movement. These signals from detector 124 can be delivered to circuit 118. Thus, the detector 124 can be used by a processor to determine whether proper cyclic paper movement has occurred. Again, such determination can be used as an indicator of a paper jam or a page break. For example, if the paper is detected as taut by remaining adjacent the guide 128 as shown in FIG. 8, then a determination of a paper jam can be made. Contrarily, if the paper is detected as loose by remaining adjacent the guide 130 as shown in FIG. 7, then a determination of a paper break can be made. The detector 124 can also be used to indicate a failure condition through lack of a paper movement signal when the drives operate in a manner which should cause the paper to move in the gap but no movement occurs.

The circuit 118 may include a self-calibrating triggering sub-circuit 134 as discussed in more detail in U.S. Pat. No. 5,879,092, the disclosure of which is fully incorporated herein by reference. Sub-circuit 134 is operative to provide a trigger signal to circuit 118 each time the paper moves between generally the positions shown in FIGS. 8 and 7.

Sub-circuit 134 is operative to compensate for changes in signals from detector 124 due to changes in conditions such as paper color, paper weight, the diameter of the take-up roll, accumulation of dirt and other factors which may affect the level of sensed reflectance as the paper moves or the amount of paper movement. Sub-circuit 134 may also be operative to adjust how much light must be sensed as reflected from the paper before it generates its signal during each cycle. This may be accomplished based on the amount of light that is reflected from the paper in the area adjacent the detector.

The detector 124 can be oriented so that when the paper moves in each cycle from generally the position shown in FIG. 8 to generally the position shown in FIG. 7, the area of the paper sensed by the detector when the paper was disposed from the detector is generally the same area that is sensed when the paper is moved closer to the detector. As a result, the generation of the trigger signal from sub-circuit 134 is based on a difference in the signals from detector 124 as generally the same area of the paper is moved between the two positions. Sub-circuit 134 operates so that the threshold level at which the sub-circuit will trigger is appropriately adjusted each time the paper drives move the paper to the position shown in FIG. 8. The threshold level for generating the signal can be determined as a function of the delta or change in reflectance detected from the paper when the paper is disposed away from the detector. In various embodiments the threshold may be established as a percentage change in reflectance. However, in other embodiments it may be a complex function. This depends on the printing and paper types used in the particular system. Of course while in this embodiment the threshold level for generating a signal is adjusted based on reflectance when the paper is disposed the extreme distances from the detector, in alternative embodiments the adjustment to the level may be based on the signals from the detector when the paper is in other positions.

Through the use of self-calibrating sub-circuit 134 a signal is more reliably provided each time paper moves between generally the positions shown in FIGS. 8 and 7. This enables detector 124 to be positioned adjacent areas where the reflectance of the paper varies due to printing thereon. The sub-circuit can also compensate for differences in reflectance during paper movement cycles due to paper color, weight, and other factors, while indicating a failure condition through lack of a paper movement signal when the drives operate in a manner which should cause the paper to move in the gap but no movement occurs.

In the operation of this embodiment, signals are generated by sub-circuit 134 responsive to the cyclical paper movement in coordination with movement of the printer and take-up roll drive mechanisms. These signals are indicative of proper paper movement like those produced by detector 70 and encoder 40 of the first embodiment. The processor 120 can execute a computer program to detect and indicate fault conditions generally in the manner previously discussed.

The second embodiment avoids the need to employ a spindle in connection with the take-up roll 114. Rather a take-up roll can be supported in a cradle or other manner. Further, the second embodiment may be used with fanfold paper or another type of paper take-up device other than a roll. When an alternative form of paper take-up is used, the detectors 122, 148 can be appropriately positioned to detect when the paper supply is low and/or the taken up paper is high.

Although the take-up roll drive mechanism 116 is schematically shown in FIG. 6 as electrically operated by the electronic circuit, it should be understood that in embodiments of the invention it may be mechanically operated. For example, the take-up roll drive may be mechanically connected with the printer drive mechanism. Such connection may include mechanical linkages which provide the coordinated operation of the printer drive and the take-up roll previously described. In this manner the take-up roll drive may operate responsive to signals by the control circuit to the printer drive.

While a form of the second embodiment provides for moving the paper in the gap adjacent to a cyclical movement detector 124 in response to paper being printed, and away from the detector when slack is removed, alternative embodiments may work in a different manner. For example, the signals indicative of paper movement could be based on movement away from a detector or a detector may be placed in connection with guide 128. Alternatively, the detector could be positioned adjacent a location of the paper where no printing occurs to simplify or eliminate the need for the self-calibrating sub-circuit. Alternatively, other paper guiding mechanisms may be used for positioning the paper in a manner which confirms proper paper movement.

While the electronic circuitry can provide a signal in response to ceasing to sense cyclical movement of the paper in the gap or detection area, other embodiments may produce different type signals when such cyclical movement is sensed or ceases to be sensed, or may change the signal type by ceasing a signal upon no longer sensing the cyclical movement of the paper. Other embodiments of the invention may move discrete sheets or a continuous web of paper in the paper path, and may move the paper in a paper path which does not include a printer, or which includes other types of devices which act upon or respond to the paper. For example, a paper take-up device may be used which reciprocates to receive folded segments of continuous paper. Alternatively, a paper take-up device may be adapted to receive separate sheets of paper in the form of a stack. Those skilled in the art may devise numerous embodiments employing the teachings of the present invention.

Thus the new fault indicating apparatus of the exemplary forms of the present invention achieves at least one of the above stated objectives, eliminates difficulties encountered in the use of prior devices and systems, solves problems, and attains the desirable results described herein.

In the foregoing description, certain terms have been used for brevity, clarity, and understanding. However no unnecessary limitations are to be implied therefrom because such terms are for descriptive purposes and are intended to be broadly construed. Moreover, the descriptions and illustrations herein are by way of examples and the invention is not limited to the details shown and described.

In the following claims, any feature described as a means for performing a function shall be construed as encompassing any means capable of performing the recited function, and shall not be limited to the particular means used for performing the function in the foregoing description, or mere equivalents.

Having described the features, discoveries and principles of the invention, the manner in which it is constructed and operated and the advantages and useful results attained; the new and useful structures, devices, elements, arrangements, parts, combinations, systems, equipment, operations, methods, processes and relationships are set forth in the appended claims.

We claim:

1. Apparatus comprising:
   an automated banking machine including a first paper moving device, a second paper moving device, a paper testing arrangement, and a currency dispenser operative to dispense currency,
   wherein the paper testing arrangement is operative to test the ability of paper in the automated banking machine to be moved by the first paper moving device responsive to both operation of the second paper moving device to move the paper and non operation of the second paper moving device,
   wherein the paper testing arrangement is operative to detect a first machine condition comprising an inability of the paper to be moved by the first paper moving device despite operation of the second paper moving device,
   wherein the automated banking machine is operative to cause generation of at least one fault signal responsive to detection of the first machine condition,
   wherein the paper testing arrangement is operative to detect a second machine condition comprising an ability of the paper to be moved by the first paper moving device despite non operation of the second paper moving device,
   wherein the automated banking machine is operative to cause generation of at least one fault signal responsive to detection of the second machine condition.

2. The apparatus according to claim 1 wherein the at least one fault signal responsive to the inability of the paper to be moved by the first paper moving device despite operation of the second paper moving device includes a fault signal type representative of a paper jam.

3. The apparatus according to claim 1 wherein the at least one fault signal responsive to the ability of the paper to be moved by the first paper moving device despite non operation of the second paper moving device includes a fault signal type representative of a paper break.

4. The apparatus according to claim 1 wherein the automated banking machine is operative to generate at least one fault signal responsive to both the inability of the paper to be moved by the first paper moving device despite operation of the second paper moving device and the ability of the paper to be moved by the first paper moving device despite non operation of the second paper moving device.

5. The apparatus according to claim 1 further comprising a paper take-up roll, wherein the take-up roll is adapted to rotate to take up printed paper, wherein the first paper moving device comprises a take-up roll drive adapted to rotate the take-up roll.

6. The apparatus according to claim 1 further comprising a printer, wherein the printer is adapted to move paper therethrough and print thereon, wherein the second paper moving device comprises a printer drive adapted to move paper relative to the printer.

7. The apparatus according to claim 6 further comprising a paper take-up roll and a coordinator, wherein the coordinator is adapted to cause the printer to move paper and cause the take-up roll to take up moved paper.

8. The apparatus according to claim 6 wherein the printer comprises a journal printer, wherein the second paper moving device comprises a journal printer drive.

9. The apparatus according to claim 8 further comprising
a paper take-up roll, wherein the take-up roll is adapted to rotate to take up printed paper, wherein the first paper moving device comprises a take-up roll drive adapted to rotate the take-up roll,
a sensor, wherein the sensor is operative to sense movement of the take-up roll,
at least one computer in operative connection with the sensor,
wherein the at least one computer is adapted to coordinate operation of the journal printer drive and the take-up roll drive,
wherein the at least one computer is operative responsive to the sensor to determine whether the take-up roll has failed to take up moved paper,
wherein the at least one computer is operative to generate at least one fault signal responsive to a determination that the take-up roll has failed to take up moved paper.

10. The apparatus according to claim 9 wherein the at least one computer is adapted to simultaneously operate the journal printer drive and the take-up roll drive.

11. The apparatus according to claim 9 wherein the automated banking machine is operative to communicate with a service center remotely located from the automated banking machine, wherein the at least one computer is operative to submit a service signal to the service center responsive to the generation of the at least one fault signal.

12. The apparatus according to claim 1 wherein the automated banking machine includes at least one input device, wherein the least one input device is operative to receive at least one input from users of the automated banking machine.

13. The apparatus according to claim 12 wherein the least one input device is operative to receive at least one input from customers using the automated banking machine.

14. The apparatus according to claim 13 wherein the automated banking machine further comprises at least one output device,
wherein the least one input device is operative to receive at least one input including a customer request,
wherein the automated banking machine is operative to determine whether the request requires movement of the paper,
wherein responsive to determining that the request requires movement of the paper, the automated banking machine is operative to test the ability of the paper to be moved by the paper testing arrangement,
wherein responsive to generation of at least one fault signal, the automated banking machine is operative to provide an output from the automated banking machine through the at least one output device reflective that the request cannot be accomplished.

15. The apparatus according to claim 14 wherein the least one input device includes a card reader operative to receive a card, and wherein responsive to generation of the at least one fault signal the automated banking machine is operative to output the card from the card reader.

16. The apparatus according to claim 14 wherein the output device includes a display screen, and wherein responsive to generation of the at least one fault signal the automated banking machine is operative to output a message on the display screen.

17. The apparatus according to claim 13
wherein the least one input device is operative to receive at least one input including a customer request,
wherein the automated banking machine is operative to determine whether the request requires movement of the paper,
wherein responsive to a negative determination, the automated banking machine is operative to carry out the request.

18. The apparatus according to claim 17 wherein responsive to a negative determination, the automated banking machine is operative to carry out the request despite generation of at least one fault signal.

19. The apparatus according to claim 13 wherein the automated banking machine is operative responsive to receiving the at least one input to attempt to perform at least one customer transaction request, wherein the automated banking machine is operative to cause the paper testing arrangement to test the ability of paper to be moved prior to attempting to perform a customer transaction request.

20. The apparatus according to claim 13 wherein the automated banking machine is operative to automatically cause the paper testing arrangement to test the ability of paper to be moved during non use of the machine by a customer.

21. The apparatus according to claim 20 wherein the automated banking machine is operative to cause the paper testing arrangement to test the ability of paper to be moved intermediate consecutive customer transaction requests.

22. The apparatus according to claim 13 further comprising a printer, wherein the automated banking machine is operative to receive at least one customer transaction request requiring printing on the paper by the printer, wherein the automated banking machine is operative responsive to the at least one customer transaction request to cause the paper testing arrangement to test the ability of paper to be moved prior to printing.

23. The apparatus according to claim 13 wherein the automated banking machine is operative to receive at least one customer transaction request requiring operation of the currency dispenser, wherein the automated banking machine is operative responsive to the at least one customer transaction request to cause operation of the currency dispenser to dispense currency.

24. The apparatus according to claim 23 wherein the at least one customer transaction request comprises a cash withdrawal request, wherein the automated banking machine is operative to cause the paper testing arrangement to test the ability of paper to be moved subsequent to receiving the cash withdrawal request but prior to operation of the currency dispenser.

25. The apparatus according to claim 24 further comprising a printer and a paper take-up roll,
- wherein the printer is adapted to print information corresponding to the cash withdrawal request on paper, wherein the second paper moving device comprises a printer drive adapted to move paper relative to the printer,
- wherein the take-up roll is adapted to rotate to take up the paper having the information printed thereon, wherein the first paper moving device comprises a take-up roll drive adapted to rotate the take-up roll.

26. The apparatus according to claim 12 wherein the least one input device is operative to receive at least one input from servicers of the automated banking machine.

27. The apparatus according to claim 1 wherein the test is operative to move paper in a first direction, wherein responsive to the paper being moved in a first direction during the test the automated banking machine is operative to cause the paper to be moved in an opposed direction at least a portion of the first distance.

28. The apparatus according to claim 27 wherein the automated banking machine is operative to cause movement of the paper in the opposed direction responsive to non generation of at least one fault signal responsive to the test.

29. The apparatus according to claim 27 wherein the automated banking machine is operative to cause the paper to be moved in the opposed direction a distance generally equal to the distance the paper was moved in the first direction.

30. The apparatus according to claim 1 wherein the paper testing arrangement is operative to move paper in a first direction during the test, wherein the automated banking machine is operative to move the paper in a direction opposite to the first direction responsive to test completion.

31. The apparatus according to claim 1 further comprising a printer and a paper supply roll, wherein the printer is adapted to print on paper supplied from the paper supply roll, wherein the first paper moving device and the second paper moving device are arranged along a printing direction in a paper moving path.

32. The apparatus according to claim 31 wherein the first paper moving device is downstream of the second paper moving device, wherein the first paper moving device comprises a printer drive adapted to move paper relative to the printer, and wherein the second paper moving device comprises a paper supply roll device.

33. The apparatus according to claim 31 wherein the first paper moving device is upstream of the second paper moving device, wherein the first paper moving device comprises a paper supply roll device, wherein the second paper moving device comprises a printer drive adapted to move paper relative to the printer.

34. The apparatus according to claim 31 and further comprising a paper take-up roll in the paper moving path, wherein the take-up roll is adapted to rotate to take up printed paper,
- wherein the test comprises a first test, wherein in the first test the first paper moving device comprises a paper take-up roll drive adapted to rotate the paper take-up roll,
- wherein in the first test the second paper moving device comprises a printer drive adapted to move paper supplied from the paper supply roll relative to the printer,
- wherein in the first test the paper testing arrangement is operative to move paper in a first direction, and wherein responsive to first test completion the paper testing arrangement is operative to perform a second test,
- wherein in the second test the paper testing arrangement is operative to test the ability of the paper to move in a reverse direction,
  - wherein in the second test the paper testing arrangement is operative to move paper away from the printer and toward the paper supply roll,
- wherein in the second test the first paper moving device comprises the printer drive and the second paper moving device comprises a paper supply roll device.

35. A method comprising:
(a) testing the ability of paper in an automated banking machine to be moved responsive to operation of a first paper moving device coordinating in operation with a second paper moving device to move the paper, wherein the automated banking machine includes a currency dispenser operative to dispense currency,
(b) testing the ability of the paper to be moved by the first paper moving device despite non operation of the second paper moving device,
(c) generating at least one fault signal responsive to any one of:
  the first paper moving device being unable to move the paper in (a), and
  the first paper moving device being able to move the paper in (b).

36. The method according to claim 35 wherein (c) includes generating at least one fault signal type representative of a paper jam responsive to the first paper moving device being unable to move the paper in (a).

37. The method according to claim 35 wherein (c) includes generating at least one fault signal type representative of a paper break responsive to the first paper moving device being able to move the paper in (b).

38. The method according to claim 35 wherein (c) includes generating at least one fault signal responsive to both the first paper moving device being unable to move the paper in (a) and the first paper moving device being able to move the paper in (b).

39. The method according to claim 35 and further including
(d) carrying out (a) and (b) responsive to receiving at least one input by the automated banking machine from a user.

40. The method according to claim 39 wherein (d) includes receiving at least one input from a customer of the automated banking machine.

41. The method according to claim 40 wherein the automated banking machine is operative to attempt performing at least one transaction responsive to the at least one input, and wherein (d) includes carrying out (a) and (b) prior to attempting to perform the at least one transaction.

42. The method according to claim 40 wherein the at least one input includes a customer request, and further including
(e) determining whether the customer request requires movement of the paper, and either
(f) responsive to the request requiring movement of the paper and responsive to the generation of a fault signal in (c), providing an output to the customer reflective that the request cannot be carried out, or
(g) responsive to the request not requiring movement of the paper, operating the machine to perform the request.

43. The method according to claim 42 wherein the at least one input from a customer includes receiving a card in the machine, wherein the output in (f) includes returning the card from the machine.

44. The method according to claim 42 wherein the automated banking machine includes a display screen, wherein the output in (f) includes displaying a message on the display screen.

45. The method according to claim 39 wherein (d) includes receiving at least one input from a servicer of the automated banking machine.

46. The method according to claim 35 wherein the automated banking machine is operative to attempt performing at least one customer transaction request,
(d) carrying out (a) and (b) prior to attempting to perform consecutive customer transaction requests.

47. The method according to claim 35 wherein the automated banking machine is operative to attempt performing at least one customer transaction request requiring printing on the paper,
(d) carrying out (a) and (b) prior to printing.

48. The method according to claim 35 wherein the automated banking machine includes at least one input device operative to receive at least one input from customers using the automated banking machine, and further comprising
(d) receiving at least one input including a customer transaction request requiring operation of the currency dispenser,
(e) operating the currency dispenser to dispense currency responsive to the at least one customer transaction request.

49. The method according to claim 48 wherein the automated banking machine includes a paper testing arrangement, wherein (d) includes receiving a cash withdrawal request, and causing the paper testing arrangement to test the ability of paper to be moved subsequent to (d) but prior to (e).

50. The method according to claim 49 further comprising a printer and a paper take-up roll, and further comprising
(f) operating the printer to print information corresponding to the cash withdrawal request on paper, wherein the second paper moving device comprises a printer drive adapted to move paper relative to the printer,
(g) rotating the take-up roll to take up the paper having the information printed thereon, wherein the first paper moving device comprises a take-up roll drive adapted to rotate the take-up roll.

51. The method according to claim 35 wherein the automated banking machine includes a paper testing arrangement, a printer and at least one input device operative to receive at least one input from customers using the automated banking machine, and further comprising
(d) receiving at least one input including a customer request requiring operation of the printer,
(e) causing the paper testing arrangement to test the ability of paper to be moved subsequent to (d).

52. The method according to claim 51 wherein (e) causes the paper to be moved a distance in a first direction, and further comprising
(f) causing the paper to be moved in an opposed direction at least a portion of the distance.

53. The method according to claim 51 further comprising
(f) operating the printer to print on the paper,
wherein (e) includes causing the paper testing arrangement to test the ability of paper to be moved subsequent to (d) but prior to (f).

54. The method according to claim 53 further comprising
(g) operating the automated banking machine to carry out at least a portion of the request,
wherein (e) includes causing the paper testing arrangement to test the ability of paper to be moved subsequent to (g) but prior to (f).

55. The method according to claim 54 wherein (d) includes receiving a cash withdrawal request, wherein (g) includes operating the automated banking machine to carry out at least a portion of the cash withdrawal request.

56. The method according to claim 52 further comprising
(g) subsequent to (f), operating the printer to print on the paper.

57. The method according to claim 56 wherein (e) includes causing the paper testing arrangement to test the ability of paper to be moved subsequent to (d) but prior to (g).

58. Computer readable media having computer readable instructions embodied thereon, the computer readable instructions operative to cause at least one computer to carry out a method comprising:
(a) testing the ability of paper in an automated banking machine including a currency dispenser to be moved responsive to operation of a first paper moving device coordinating in operation with a second paper moving device to move the paper;
(b) testing the ability of the paper to be moved by the first paper moving device despite non operation of the second paper moving device; and
(c) generating at least one fault signal responsive to any one of:
the first paper moving device being unable to move the paper in (a), and
the first paper moving device being able to move the paper in (b).

59. Apparatus comprising:
an automated banking machine including an upstream paper moving device, a downstream paper moving device, a currency dispenser, and at least one computer,
wherein the at least one computer is operative to cause the upstream paper moving device to operate to move paper in a first direction and to cause the downstream paper moving device to operate to move the paper in the first direction, and
wherein the automated banking machine is operative to detect
(a) the upstream paper moving device operating to move the paper in the first direction and the downstream paper moving device operating but not moving the paper in the first direction, and
(b) the downstream paper moving device operating and moving the paper in the first direction when the upstream paper moving device had not operated, wherein the at least one computer is operative to cause generation of at least one fault signal responsive to detection of any one of (a) and (b).

60. A method comprising:
(a) operating an upstream paper moving device to move paper in a first direction in an automated banking machine including a currency dispenser;
(b) operating a downstream paper moving device to move paper in the first direction in the machine in coordinated relation with the operation of the upstream paper moving device, wherein the machine is operative to determine an inability of the downstream paper moving device to move the paper in the first direction despite the coordinated operation of the upstream paper moving device to move the paper in the first direction, and wherein the machine is operative to determine an ability of the downstream paper moving device to move the paper in the first direction despite the coordinated non operation of the upstream paper moving device to move the paper in the first direction;
(c) generating at least one fault signal responsive to the machine determining any one of
the inability of the downstream paper moving device to move the paper in the first direction despite the coordinated operation of the upstream paper moving device to move the paper in the first direction, and
the ability of the downstream paper moving device to move the paper in the first direction despite the coordinated non operation of the upstream paper moving device to move the paper in the first direction.

* * * * *